Figure 1:
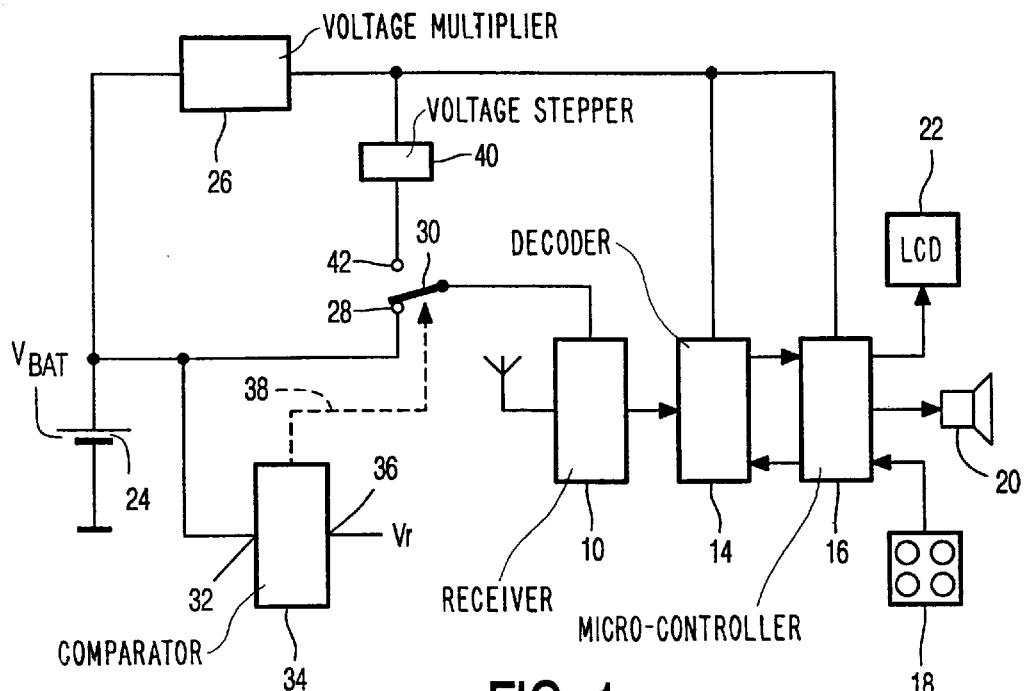

United States Patent
Razak

Patent Number: 6,028,374
Date of Patent: Feb. 22, 2000

[54] EXTENDING BATTERY LIFE IN ELECTRONIC APPARATUS

[75] Inventor: Ahmed A. Razak, Hemel Hempstead, United Kingdom

[73] Assignee: U.S. Philips Corporation, New York, N.Y.

[21] Appl. No.: 09/121,578

[22] Filed: Jul. 23, 1998

[30] Foreign Application Priority Data

Aug. 1, 1997 [GB] United Kingdom .................. 9716142

[51] Int. Cl.<sup>7</sup> ...................................................... H04B 1/16
[52] U.S. Cl. .............................. 307/130; 307/66; 363/59; 455/343
[58] Field of Search ............................... 307/130, 64, 66; 363/59; 455/38.3, 343

[56] References Cited

U.S. PATENT DOCUMENTS

| | | | |
|---|---|---|---|
| 4,560,887 | 12/1985 | Schneider | 307/66 |
| 5,193,212 | 3/1993 | Son | 455/38.3 |
| 5,399,956 | 3/1995 | De Luca et al. | 363/59 |
| 5,410,734 | 4/1995 | Choi et al. | 455/343 |
| 5,448,756 | 9/1995 | DeLuca et al. | 455/343 |

FOREIGN PATENT DOCUMENTS 2284085  5/1995  United Kingdom ............ H04Q 7/18

*Primary Examiner*—Albert W. Paladini
*Attorney, Agent, or Firm*—Jack D. Slobod

[57] ABSTRACT

An electronic apparatus such as a digital wide area pager has a receiver IC (10) capable of operating directly from a single cell battery (24) for as long as the terminal voltage ($V_{BAT}$) is above a specified minimum voltage. Other ICs (14, 16) of the pager operate at a higher voltage supplied by a multiplier (26) connected to the battery (24). The multiplier (26) is able to operate at values of $V_{BAT}$ below the specified minimum voltage. A control circuit (34) determines when the terminal voltage ($V_{BAT}$) decays below the specified minimum voltage and supplies the receiver IC (10) with a stepped-down voltage from the multiplier (26) to ensure its sensitivity remains acceptable.

7 Claims, 2 Drawing Sheets

EXTENDING BATTERY LIFE IN ELECTRONIC APPARATUS

The present invention relates to an electronic apparatus particularly, but not exclusively, to a radio apparatus fabricated from integrated circuits at least one of which operates at a different voltage to the others. For convenience of description the present invention will be described with reference to a digital one-way pager.

Typically, a one-way pager comprises a receiver IC, a decoder IC and a microprocessor IC together with one or more transducers and one or more push buttons providing a man-machine interface. The integrated circuits currently in use in pagers operate at various voltages in the range between 0.85 and 3.5 volts. The compactness of a one-way pager means that its power source is usually a single cell battery having a terminal voltage of 1.5 volts which is stepped up by a dc-dc converter say 3 volts. As is known dc-dc converters have an efficiency of the order of 60 to 90% which reduces the effective life of the cell.

Recently a new generation of receiver integrated circuits (ICs) has been developed having a minimum operating voltage which enables them to operate directly from a single cell supply provided the terminal voltage does not drop below the specified minimum operating voltage. However a voltage multiplier is still required for other ICs such as the decoder and microcontroller so that the saving of power by operating the receiver directly from the cell is limited. A problem which arises by using a small, limited capacity cell is that the terminal voltage drops not only as the battery is drained under normal demands but also when there are relatively high demands from transducers. As a consequence the sensitivity of the receiver decreases and/or fluctuates in response to sudden, short duration demands on the cell. One consequence of this is that the cell has to be replaced prematurely in order to maintain the sensitivity of the receiver.

An object of the present invention is to extend the useful life of a battery directly powering at least part of an overall electronic circuit for as long as possible.

According to the present invention there is provided an electronic apparatus comprising means for receiving a battery providing a terminal voltage, a first part designed to be operated at the terminal voltage of the battery when equal to or above a predefined minimum voltage, a second part designed to be operated at a voltage higher than that of the battery, voltage multiplying means for multiplying the battery voltage and for supplying it to the second part, and control means for comparing a voltage representative of the terminal voltage with a reference voltage and whenever the reference voltage is the greater, causing current to be supplied to the first part from the voltage multiplying means.

The present invention is based on recognition of the fact that whenever possible power should be supplied directly by a cell to the first part but if the terminal voltage should drop, the current supply to the first part is replaced by current supplied from the multiplier to maintain full circuit operation and sensitivity. As a result the first part can remain fully operative whilst the terminal voltage of the cell has dropped below the predefined minimum voltage thus extending the useful life of the cell because the multiplier can operate successfully down to a lower minimum terminal voltage. Thus all the available battery capacity is used to power the electronic apparatus even though the battery voltage level has dropped below that at which at least parts of the apparatus would operate at.

If desired the voltage multiplying means may produce a regulated higher voltage and means may be provided for stepping down the regulated higher voltage for supply to the first part.

In an embodiment of the electronic apparatus the first part comprises an integrated radio receiver, such as a receiver for receiving paging signals, and the second part comprises at least a paging signal decoder.

Figure 2:
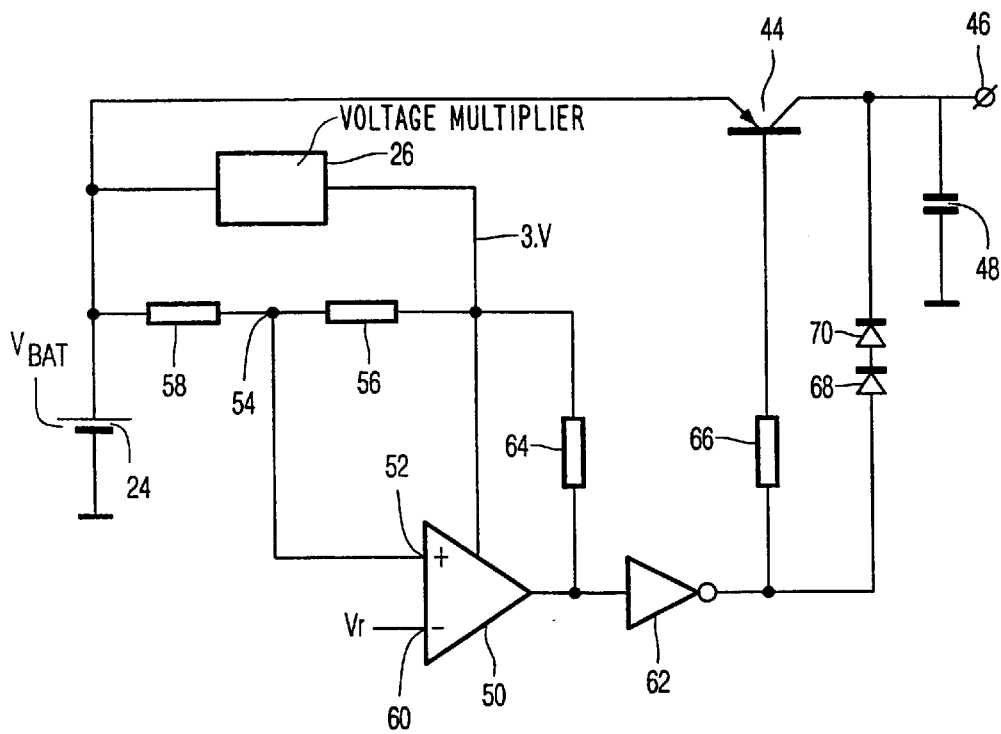
Figure 3:
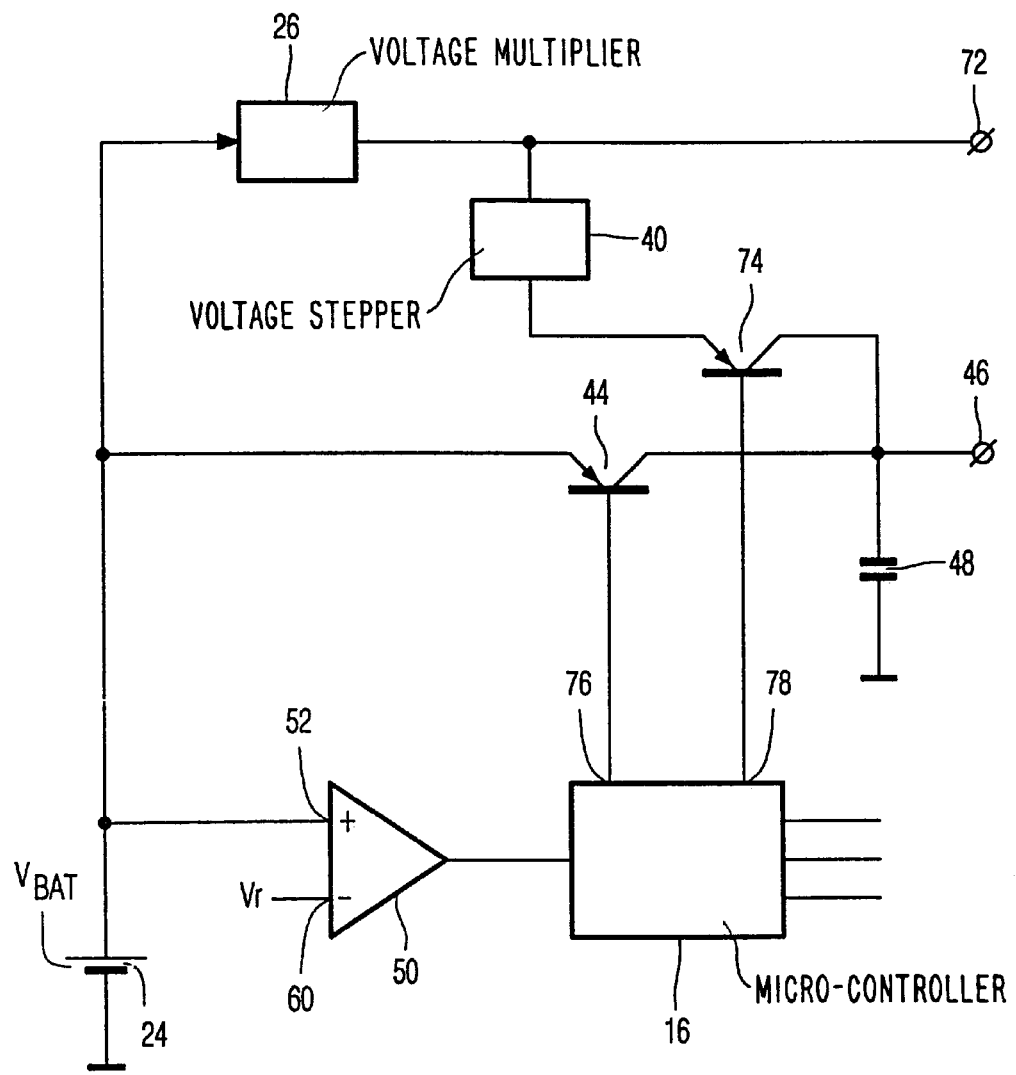

The present invention will now be described, by way of example, with reference to the accompanying drawings, wherein:

FIG. 1 is a block schematic diagram of a pager made in accordance with the present invention, FIG. 2 is a diagram partially in block form illustrating one embodiment of a control circuit, and FIG. 3 is a diagram partially in block form illustrating another embodiment of a control circuit.

In the drawings the same reference numerals have been used to indicate corresponding features.

Referring to FIG. 1, the pager comprises an integrated receiver IC 10 having a signal input coupled to an antenna 12. A decoder IC 14 is coupled to an output of the receiver 10 and serves to decode the demodulated signals. A microcontroller IC 16 is coupled to the decoder IC 14 and serves to process signals produced by the decoder and to control various functions of the pager. In a non-illustrated embodiment the decoder is implemented using software in the microcontroller IC16 itself thus reducing the IC count. A switch pad 18 is coupled to the microcontroller IC 16 and serves as a man-machine interface. An acoustic transducer 20 is coupled to an output of the microcontroller IC 16 and serves to provide an audible alert in response to the receipt of a signal. Other annunciating devices, not shown, including a LED light emitter and a vibrator may be provided. A LCD panel 22, including a driver, is coupled to another output of the microcontroller IC16.

In the illustrated pager, the receiver IC 10 can operate from a specified minimum voltage of 1.05V upwards to say 1.5V whereas the decoder IC 14 and microcontroller IC 16 operate at a higher voltage of the order of 3 volts. A single cell battery 24 providing a voltage $V_{BAT}$ of the order of 1.5 volts maximum is coupled to a voltage multiplier 26, for example a MAX 867, to a pole 28 of a single pole changeover switch 30 and to an input 32 of a voltage comparator circuit 34. A reference voltage Vr is applied to a second input 36 of the comparator 34 which provides an output 38 for controlling the switch 30. The value of Vr corresponds to the minimum operating voltage of the IC 10 as specified by the manufacturer in this instance 1.05 volts. The voltage multiplier 26 produces a regulated 3 volt output which is coupled to a second pole 42 of the switch 30 by way of a voltage stepping stage 40 and to the decoder IC 14 and the microcontroller IC 16. The voltage stepping stage 40 drops the voltage by approximately half to say 1.5 volts.

In operation when the terminal voltage of the battery 24 is greater than Vr (1.05 volts), the switch 30 is controlled to couple the battery voltage on the terminal 28 to the receiver IC 10 which is able to operate with an acceptable sensitivity. If now there is a sudden demand on the battery power causing the terminal voltage of the battery to drop below the reference voltage Vr, the comparator 34 causes the switch 30 to change-over to the terminal 42 so that a stepped down version of the voltage output of the multiplier 26 is supplied to the receiver IC 10 to thereby maintain its sensitivity. The change-over of the switch 30 to the multiplier 26 output lasts for at least as long as the surge in demand lasts. However because the efficiency of the multiplier 26 is of the order of 75% there is an increased drain on the battery 24 due to the receiver IC 24 being powered by the multiplier 26. This increase in current drain can be justified by the sensitivity of the receiver IC 10 being maintained at or above an acceptable level thereby ensuring that calls can still be received.

In the event of the battery 24 degenerating to a point where its terminal voltage $V_{BAT}$ is below the reference voltage Vr, the comparator 34 causes the switch 30 to be connected to the pole 42 so that the receiver IC 10 is powered via the multiplier 26 which is able to operate down to a $V_{BAT}$ which equals the lowest voltage possible for operation of the multiplier 26, that is, of the order of say 0.6V.

Without the option of applying a stepped down version of the multiplier 26 regulated voltage to the receiver IC 10, it would have been necessary to discard a battery once its terminal voltage $V_{BAT}$ had decayed to Vr (1.05 volts) which is wasteful especially as the battery could still be used down to approximately 0.6 volts for multiplying the battery voltage to produce a regulated voltage. It is estimated that the wastage is of the order of 30% of the battery capacity.

FIG. 2 illustrates an embodiment of the comparator 34 and switch 30 which can be used in the circuit shown in FIG. 1. The battery 24 is coupled to the emitter electrode of a common base connected PNP transistor 44 which functions as the switch 30. The collector electrode of the transistor 44 is coupled to a receiver power supply terminal 46. A capacitor 48 is provided in the receiver supply path to smooth out any ripples and other interferences, for convenience of illustration the capacitor 48 is shown connected to the terminal 46. A comparator 50 has a non-inverting input 52 connected to a junction 54 of a potential divider formed by resistors 56, 58 connected in series between a regulated 3V supply from the multiplier 26 and the battery terminal. The comparator 50 itself operates from the 3V supply. A reference voltage Vr, which may be derived from the regulated voltage supply, is applied to an inverting input 60 of the comparator 50.

The output of the comparator is coupled to an inverter 62, the input of which is coupled by way of a resistor 64 to the regulated voltage supply. The output of the inverter 62 is coupled by way of a resistor 66 to the base electrode of the transistor 44. Also a voltage step-down arrangement comprising series connected diodes 68, 70 is connected between the output of the inverter 62 and the terminal 46.

In operation, for a $V_{BAT}$ greater than 1.05V, the comparator 50 output is high which in turn means that the output of the inverter 62 is low. Transistor 44 is forward biassed and saturated so that substantially the full battery voltage $V_{BAT}$ is applied to the terminal 46.

For a $V_{BAT}$ less than 1.05V, the output of the comparator 50 is low causing the output of the inverter 62 to go high. The transistor 44 is reverse biased effectively disconnecting the battery from the terminal 46. The series connected diodes 68, 70 steps down the 3 volts derived from the output of the inverter 62 to 1.5 volts which appears on the terminal 46. This will continued until the multiplier 26 can no longer operate as the battery voltage has decreased to below its minimum operating voltage.

In those situations when the battery voltage is greater than 1.05 volts, but there is a sudden demand for current, $V_{BAT}$ drops temporarily below 1.05V and the illustrated circuit operates dynamically to ensure that the receiver supply does not drop below 1.05V. In this way the receiver can operate efficiently while $V_{BAT}$ is above 1.05 volts and maintain operation, though less efficient, for lower battery voltage.

For the sake of completeness the resistors 56, 58, 64 and 66 each have the value of 470k, 47k, 100k and 22k. Using these values then for $V_{BAT}=1.05$ volts and a regulated supply voltage of 3V, the voltage at the junction 54 (or input 52) is 1.25V. In this numeric example Vr=1.25V, which corresponds to a battery voltage of 1.05V.

If desired the transistor 44 could be a field effect transistor (FET) with its source-drain path connected between the battery 24 and the terminal 46 and its gate electrode connected to the resistor 66.

FIG. 3 shows an embodiment of the control circuit in which the microcontroller 16 monitors the output of the comparator 50 and provides the signals for controlling the switching of the dc power to the terminal 46.

More particularly the voltage multiplier 26, the emitter electrode of PNP transistor 44 and the non-inverting input 52 of the comparator 50 are coupled to the positive terminal of the battery 24. A reference voltage Vr is applied to an inverting input 60 of the comparator. An output of the comparator 50 is coupled to the microcontroller 16.

An output of the voltage multiplier 26 is coupled to a terminal 72 which is coupled to those circuit elements, such as the microcontroller 16, which require a supply voltage of say 3 volts and to the voltage stepping stage 40. An output of the stage 40 is coupled to an emitter electrode of another PNP transistor 74. Collector electrodes of the transistors 44, 74 are coupled to the terminal 46 for supplying a lower voltage required by other circuit elements, such as the receiver IC 10 (FIG. 1). Base electrodes of the transistors 44, 74 are connected to respective outputs 76, 78 of the microcontroller 16. The capacitor 48 is coupled to the terminal 46 to smooth any ripples and other interferences on the voltage supplied to that terminal.

Assume that the terminal voltage $V_{BAT}$ is greater than 1.05V, the state of the comparator's output is high so that the output 76 is High rendering the transistor 44 conductive and the output 78 is Low rendering the transistor 74 non-conductive. If $V_{BAT}$ drops below Vr, the state of the comparator's output changes to Low causing the outputs 76, 78 to change state to Low and High, respectively.

Insodoing the current supplied to the terminal 46 is derived from the multiplier 26 by way of the voltage stepping stage 40 and the emitter—collector path of the transistor 74. The circuit changes back when $V_{BAT}$ is greater than Vr.

If desired the transistors 44, 74 may be NPN transistors or FETs.

Although the present invention has been described with reference to a digital pager, it can be applied to other electronic apparatus, such as portable telecommunications apparatus like cellular and cordless telephones.

From reading the present disclosure, other modifications will be apparent to persons skilled in the art. Such modifications may involve other features which are already known in the design, manufacture and use of electronic apparatus and component parts thereof and which may be used instead of or in addition to features already described herein.

I claim:

1. An electronic apparatus comprising means for receiving a battery providing a terminal voltage, a first part designed to be operated at the terminal voltage of the battery when equal to or above a predefined minimum voltage, a second part designed to be operated at a voltage higher than that of the battery, voltage multiplying means for multiplying the battery voltage and for supplying it to the second part, and control means for comparing a voltage representative of the terminal voltage with a reference voltage and whenever the reference voltage is the greater, causing current to be supplied to the first part from the voltage multiplying means.

2. An apparatus as claimed in claim 1, characterised in that the voltage multiplying means produces a regulated higher voltage and in that means are provided for stepping down the regulated higher voltage for supply to the first part.

3. An apparatus as claimed in claim 1, characterised in that the first part comprises an integrated radio receiver.

4. An apparatus as claimed in claim 1, characterised in that the first part comprises an integrated radio receiver and the second part comprises at least a paging signal decoder.

5. An apparatus as claimed in claim 1, characterised in that the control means comprises semiconductor switching means which is forward biased whenever the voltage representative of the terminal voltage is greater than the reference voltage and which is reverse biased whenever the reference voltage is the greater.

6. An apparatus as claimed in claim 1, characterised by a first switching means coupled between the battery receiving means and the first part, a second switching means coupled between the voltage multiplying means and the first part, comparing means for comparing the terminal voltage with a reference voltage and providing an output control signal indicative of whether the terminal voltage exceeds the reference voltage and vice versa, and logic means for controlling the first and second switching means in response to the output control signal, whereby whenever the first switching means is conductive, the second switching means is non-conductive, and vice versa.

7. An apparatus as claimed in claim 1, characterised in that means are provided for smoothing the voltage to be applied to said first part.

* * * * *